(12) United States Patent
Kanuri et al.

(10) Patent No.: US 10,170,783 B2
(45) Date of Patent: *Jan. 1, 2019

(54) MANUFACTURE OF A FUEL CELL WITH LIQUID ELECTROLYTE MIGRATION PREVENTION

(75) Inventors: Sridhar V. Kanuri, Milford, CT (US); Richard D. Breault, North Kingstown, RI (US); Kishore Kumar Tenneti, Vernon, CT (US); Ned E. Cipollini, Enfield, CT (US); Frank E. Kenney, III, Tolland, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 776 days.

This patent is subject to a terminal disclaimer.

(21) Appl. No.: 13/145,626

(22) PCT Filed: Jun. 18, 2009

(86) PCT No.: PCT/US2009/003648
§ 371 (c)(1),
(2), (4) Date: Jul. 21, 2011

(87) PCT Pub. No.: WO2010/123478
PCT Pub. Date: Oct. 28, 2010

(65) Prior Publication Data
US 2012/0028172 A1 Feb. 2, 2012

Related U.S. Application Data

(60) Provisional application No. 61/214,130, filed on Apr. 20, 2009.

(51) Int. Cl.
H01M 8/00 (2016.01)
H01M 8/086 (2016.01)
(Continued)

(52) U.S. Cl.
CPC ......... *H01M 8/086* (2013.01); *H01M 8/0284* (2013.01); *H01M 8/0286* (2013.01); *H01M 8/0228* (2013.01); *Y02P 70/56* (2015.11)

(58) Field of Classification Search
CPC ............ H01M 8/04; H01M 8/24; H01M 2/08; H01M 8/0228; H01M 8/0284;
(Continued)

(56) References Cited

U.S. PATENT DOCUMENTS 4,728,533 A * 3/1988 Feigenbaum et al. ........ 429/508
5,536,598 A * 7/1996 LaFollette ..................... 429/210
(Continued)

FOREIGN PATENT DOCUMENTS

JP 10289722 A * 10/1998

OTHER PUBLICATIONS

Machine translation of patent application publication JP 10-289722, Oct. 27, 1998.*

*Primary Examiner* — Lingwen R Zeng
(74) *Attorney, Agent, or Firm* — Carlson, Gaskey & Olds

(57) ABSTRACT

A stack (10) of fuel cells (11) is manufactured with barriers (32) to prevent migration of a liquid electrolyte (such as phosphoric acid) out of the cells (11). The barrier (32) is secured within a step (34) formed within a land region (28) of a separator plate assembly (18) and extends from an edge (30) of the separator plate assembly (18) all or a portion of a distance between the edge (30) and a flow channel (24) defined within the separator plate assembly (18). The barrier (32) also extends away from the edge (30) a distance of between 0.051 and about 2.0 millimeters (about 2 and about 80 mils. The barrier (32) includes a hydrophobic, polymeric film (36), a pressure sensitive adhesive (38) as an assembly aid, and a fluoroelastomer bonding agent (40).

23 Claims, 5 Drawing Sheets

(51) Int. Cl.
*H01M 8/0284* (2016.01)
*H01M 8/0286* (2016.01)
*H01M 8/0228* (2016.01)

(58) Field of Classification Search
CPC ..... H01M 8/0286; H01M 8/086; Y02E 60/50;
Y02P 70/56
USPC ....... 429/455, 35, 36, 38, 39, 30, 33, 41, 44
See application file for complete search history.

(56) References Cited

U.S. PATENT DOCUMENTS

| | | | |
|---|---|---|---|
| 2003/0013004 A1* | 1/2003 | Oyanagi | H01M 4/921 |
| | | | 429/481 |
| 2005/0136322 A1* | 6/2005 | Bartling et al. | 429/82 |
| 2005/0153188 A1* | 7/2005 | Schenk et al. | 429/32 |

* cited by examiner

MANUFACTURE OF A FUEL CELL WITH LIQUID ELECTROLYTE MIGRATION PREVENTION

CROSS REFERENCE TO RELATED APPLICATION

This application claims the benefit of U.S. Provisional Patent Application Ser. No. 61/214,130 that was filed on Apr. 20, 2009 entitled "Fuel Cell With A Barrier To Acid Migration Out Of The Fuel Cell".

TECHNICAL FIELD

The present disclosure relates to manufacture of fuel cells that are suited for usage in transportation vehicles, portable power plants, or as stationary power plants, and especially to manufacture of a fuel cell including a barrier to migration of an acid electrolyte from the fuel cell into an adjacent fuel cell.

BACKGROUND ART

Fuel cells are well known and are commonly used to produce electrical current from hydrogen containing reducing fluid, fuel and oxygen containing oxidant reactant streams, to power various types of electrical apparatus. Many fuel cells use a liquid electrolyte such as phosphoric acid, and such fuel cells are typically adjacent other fuel cells to form a well known fuel cell stack having manifolds and associated plumbing to deliver and remove reactant and exhaust stream, etc.

Phosphoric acid electrolyte fuel cells are frequently associated with a problem of migration of acid out of one cell into an adjacent cell. Many efforts have been undertaken to resolve this problem. Such efforts are disclosed, for example, in commonly owned U.S. Pat. No. 5,079,104 to Roche et al., U.S. Pat. No. 5,156,929, to Dec et al., U.S. Pat. No. 5,178,968 to Roche, U.S. Pat. No. 5,270,132 to Breault et al., U.S. Pat. No. 5,837,395 to Breault et al., and U.S. Pat. No. 6,050,331 to Breault et al., which patents are hereby incorporated herein by reference thereto.

Such phosphoric acid fuel cells contain excess acid to accommodate acid loss due to evaporation into the reactant streams, loss due to absorption by cell components and loss by reaction with materials within the cell. This excess acid is stored in electrolyte reservoir plates which may be a separate component or the electrolyte storage function may be integrated into the porous electrode substrate. Managing the liquid electrolyte within a fuel cell is a significant design challenge.

The carbonaceous materials at the edges of planar components of the fuel cell that are exposed to the air inlet and air exit manifolds are oxidized due to chemical reaction. The extent of oxidation is a function of the electrochemical potential, the partial pressure of water vapor and the local temperature. Oxidation is normally greater at the air inlet edge of the cell due to higher temperatures than at the air exit edge of the cell. Oxidation typically is minimal on the edges exposed to the reactant fuel.

Oxidation of the carbonaceous material results in the material at the edge of the cell becoming wettable and leads to the presence of an acid film along the edge of the separator plate assembly. This acid film results in an ionic shunt current path along the edge of the fuel cell. This shunt current path results in protons (hydrogen ions) flowing from the positive end of a substack of cells to the negative end of the substack along the edges of the cells. A "substack" of fuel cells is a group of typically 4-8 cells disposed between cooling plates within the fuel cell stack. There are two consequences to these shunt currents. The first consequence is that the shunt current lowers the electrolyte potential such that carbon corrosion occurs at the positive end of the substack. Carbon corrosion is a significant issue for fuel cells operating at elevated reactant pressures where the electrode potentials are higher than at ambient pressure. The second consequence is that the shunt current results in the flow of anions (di-hydrogen phosphate) from the negative end of the sub-stack to the positive end of the sub-stack. The hydrogen ions and the di-hydrogen phosphate ions combine at the positive end of the sub-stack. This results in acid being pumped from the negative end of the sub-stack to the positive end of the sub-stack along the edge of the stack. The consequences of this acid pumping is that the cells at the negative end will fail due to reactant cross-over due to the loss of acid; and the positive cell will fail due to poor performance due to the excess acid. Acid pumping from cell to cell significantly reduces the useful life of the fuel cell. The acid pumping problem is most severe in cells with small electrolyte reservoirs.

FIG. 1 presents a schematic representation of the above described acid pumping or acid migration between "Cell 1" and "Cell 2", wherein such cells would be two of many fuel cells in a fuel cell stack assembly 10. It is noted that an "integral separator plate", also referred to herein as a "separator plate assembly" 18 is located between the cathode electrode 12 of "Cell 1" and the anode electrode 14 of "cell 2". While the separator plate assembly defines reactant passage flow fields for both adjacent electrodes separated by an impermeable layer, FIG. 1 shows schematically how acid migrates as a film along an edge of the integrated separator plate between "Cell 1" and "Cell 2".

SUMMARY

The disadvantages and limitations of the background art discussed above are overcome by the present disclosure. The disclosure includes a fuel cell for generating electrical current from hydrogen containing reducing fluid fuel and oxygen containing oxidant reactant streams. The fuel cell includes a cathode electrode and an anode electrode secured adjacent a matrix containing a liquid acid electrolyte. A separator plate assembly is secured adjacent both the cathode electrode of one cell and the anode electrode of an adjacent cell. The separator plate assembly defines a first flow field adjacent a first contact surface of the separator plate assembly which includes at least one flow channel defined between ribs of the separator plate assembly so that the at least one flow channel is defined below the first contact surface and so that the first contact surface contacts the adjacent electrode to direct one of the reactant streams adjacent the electrode. The separator plate assembly also includes land regions extending along the first contact surface on each side of each flow field to an edge of the separator plate assembly and extending about parallel to a direction of the flow channel.

A barrier to acid migration is secured within a step defined within the land region of the separator plate assembly and the barrier extends from the edge of the separator plate assembly all or a portion of a distance between the edge and the flow channel. The barrier also extends away from the edge of the separator plate assembly a distance of between about 0.051 and about 2.0 millimeters (about 2 and about 80 mils; a mil is 0.001 inch). The barrier includes a hydrophobic film, a pressure sensitive adhesive (a manufacturing aid) and a bonding agent.

The disclosure includes a method of manufacturing a fuel cell having a barrier to acid migration, described in more detail below and within the attached Figures.

DESCRIPTION OF THE PREFERRED EMBODIMENTS

Figure 1:
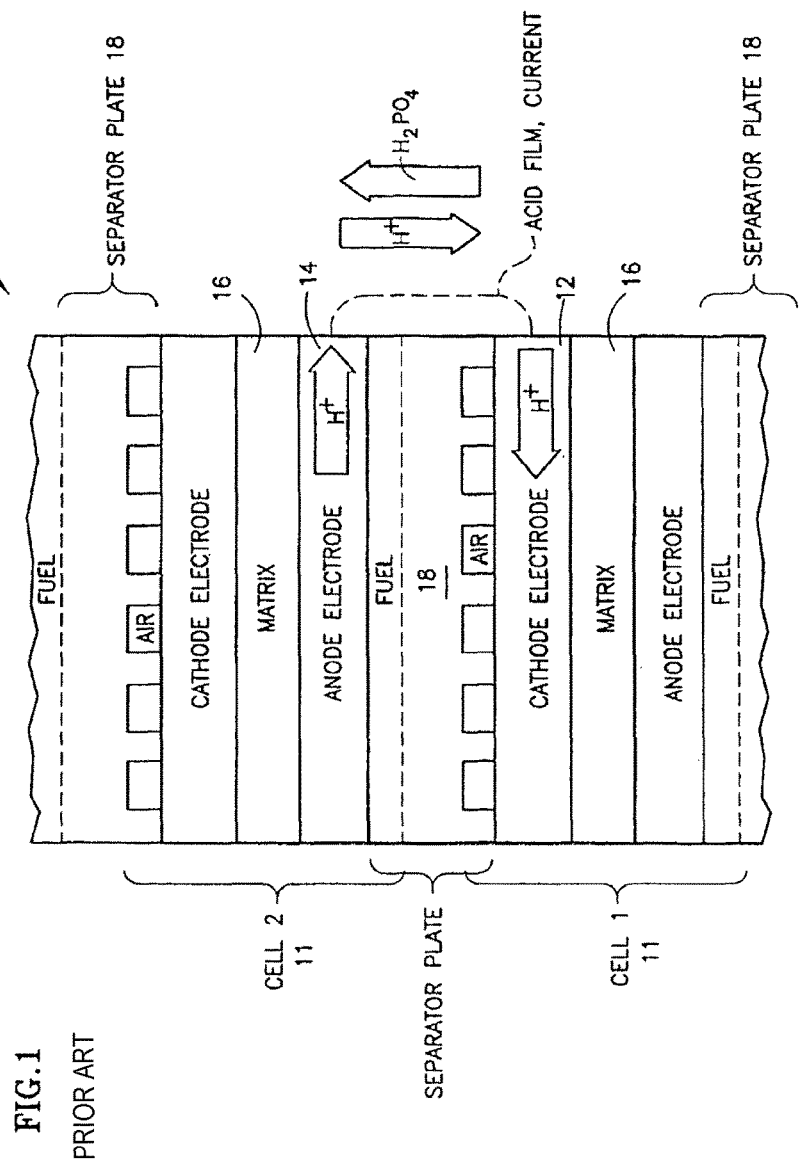
FIG. 1 is a simplified schematic representation of a "Cell 1" and a "Cell 2" showing components of the cells, development of acid migration from "Cell 1" to "Cell 2", and a shunt current associated therewith.
Figure 2:
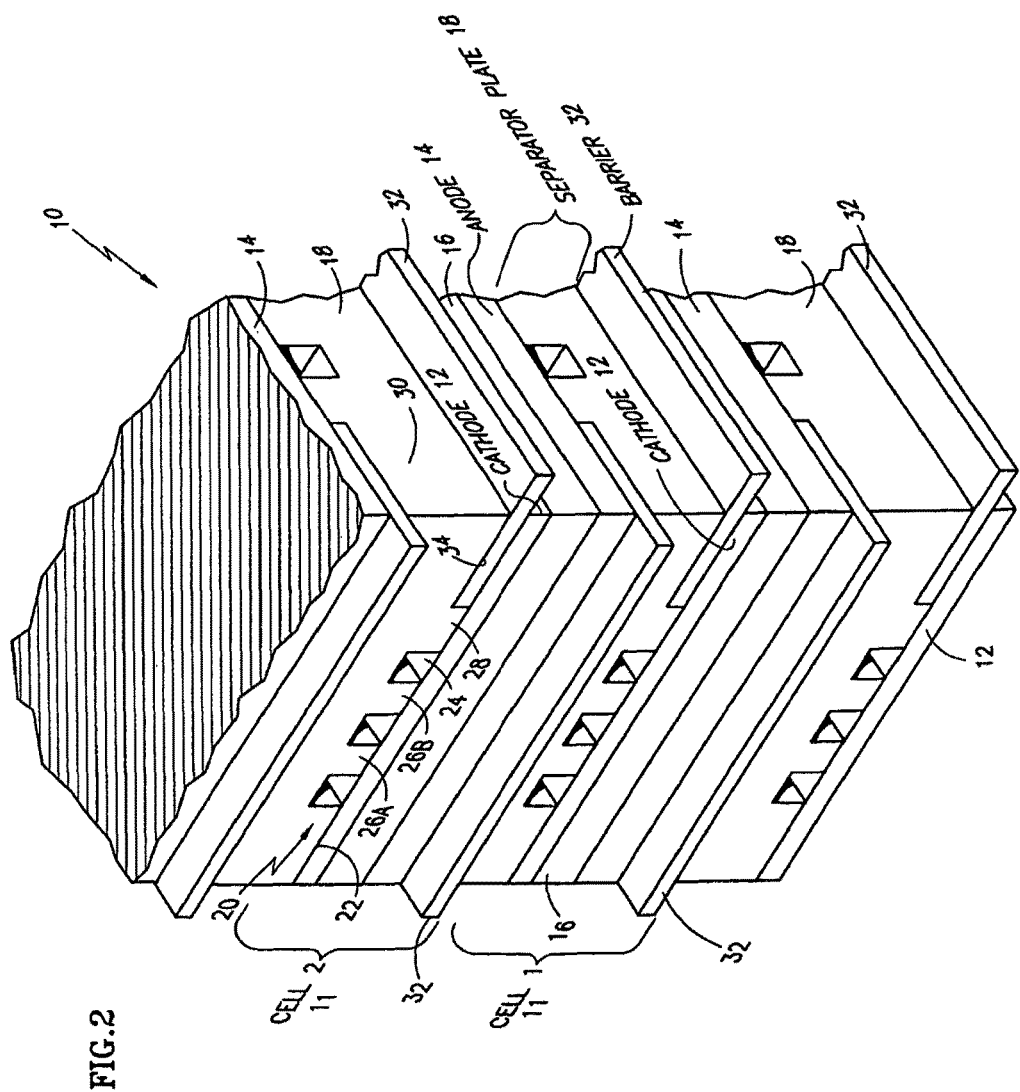
FIG. 2 is a fragmentary, simplified perspective view of a fuel cell having a barrier to acid migration out of the fuel cell in accordance with the present disclosure.

Referring to the drawings in detail, portions of a stack 10 of fuel cells 11 with barriers to acid migration out of the fuel cells are shown in FIG. 2. It is noted that the simplified schematic of FIG. 2 includes a cathode electrode 12 of a first fuel cell 11 ("Cell 1" of FIG. 1) and an anode electrode 14 of an adjoining second cell 11 ("Cell 2" of FIG. 1). As shown in FIG. 1, each fuel cell also includes a matrix 16 containing a liquid acid electrolyte, such as phosphoric acid or fluoroborate acid.

A separator plate assembly 18 is secured between the cathode electrode 12 of one cell 11 (e.g., Cell 1) and the anode electrode 14 of an adjacent cell 11 (e.g., cell 2). The separator plate assemblies 18 may be made according to the disclosure of a "Fuel Cell Separator Plate Assembly" disclosed in Patent Application Publication No. US 2008/0057373 A1, published on Mar. 6, 2008, or may take the form of a ribbed type of separator plate shown in FIG. 1 of U.S. Pat. No. 4,734,906. Each separator plate assembly 18 defines a first flow field 20, such as a cathode flow field, adjacent a first contact surface 22 of the separator plate assembly 18. The first flow field 20 includes at least one flow channel 24 defined between ribs 26A, 26B of the separator plate assembly 18 so that the at least one flow channel 24 extends inwardly from the first contact surface 22 and so that the first contact surface 22 contacts the adjacent cathode electrode 12 to direct an oxidant reactant stream adjacent the cathode electrode 12.

Figure 3:
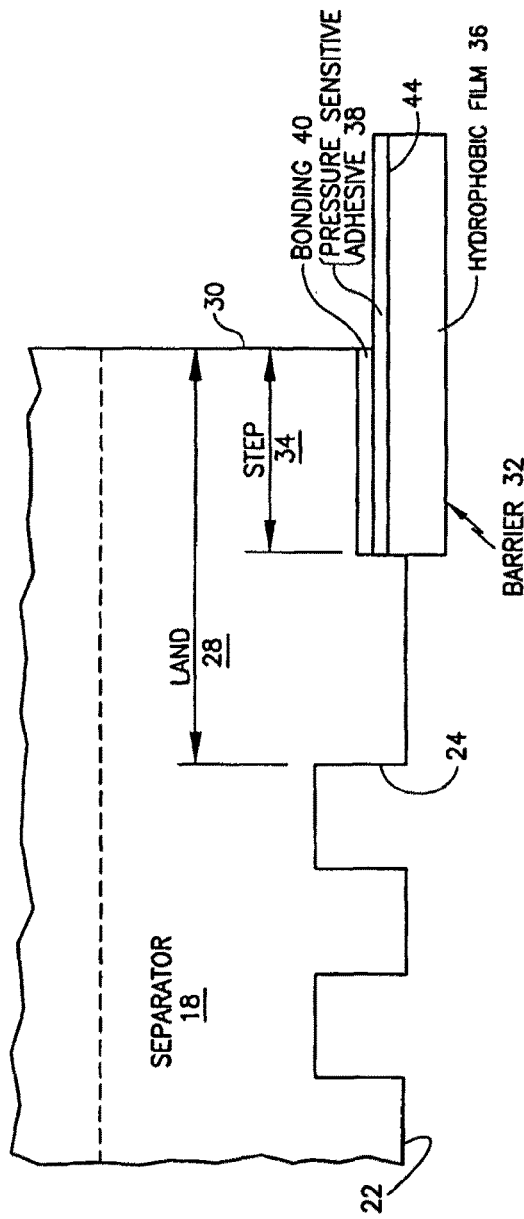
FIG. 3 is a simplified, fragmentary, schematic representation of the barrier to acid migration of FIG. 2, in accordance with the present disclosure.

The separator plate assembly 18 comprises a land region 28 shown in FIGS. 2 and 3 extending along the first contact surface 22 between an edge 30 of the separator plate assembly 18 and the adjacent flow channel 24 and extending parallel to the flow channels 24. An acid migration barrier 32 is secured within a step 34 defined within the land region 28 of the separator plate assembly 18. The barrier extends from the edge 30 of the separator plate assembly 28 all or a portion of the distance between the edge 30 and the adjacent flow channel 24. The barrier also extends away from the edge of the separator plate assembly a distance of between about 0.051 and about 2.0 millimeters (about 2 and about 80 mils. The barrier includes a hydrophobic film 36, a pressure sensitive adhesive 38 and a bonding agent 40. In a preferred embodiment, the hydrophobic film 36 is defined as a polymeric film which has a contact angle of greater than 90° with a liquid electrolyte at cell operating temperature and acid concentration, which has a melting point at least 50° C. (90° F.) above the cell operating temperature, and is chemically stable for 10 years in the environment of the fuel cell stack 10. Suitable barrier film materials include polytetrafluoroethylene (PTFE), fluorinated ethylene propylene (FEP), and polyfluoroaloxy co-polymer resin (PFA).

The hydrophobic film 36 is equal to or greater than 2 mils (0.05 mm) thick and preferably between 2 mills (0.05 mm) and 5 mils (0.13 mm) thick. Below 2 mils it is too difficult to handle and above 5 mils there are cost and structural issues.

The pressure sensitive adhesive 38 (PSA) may be an acrylic or silicone adhesive and is about 0.038 mm (about 1.5 mil) thick. The pressure sensitive adhesive 38 is simply an assembly aide and can be of any thickness between 0.5 and 2 mils. The hydrophobic film preferably has one surface 44 coated with the PSA.

The bonding agent 40 may be an elastomer that is compatible in the fuel cell stack 10 and is preferably a fluoroelastomer. Suitable fluoroelastomers include FLUOREL®, VITON®, and FLUOROLAST®. The fluorine content of the fluoroelastomer bonding 40 must be 68% or greater to have acceptable corrosion resistance in a phosphoric acid fuel cell (PAFC). The preferred thickness of the fluoroelastomer is between 0.5-2.0 mils (0.0125-0.05 mm). Below 0.5 mils the bond is inadequate and above 2.0 mil there is a problem with extrusion of the elastomer bonding 40 during the initial heat-up of the stack. The elastomer bonding 40 may be applied to the hydrophobic film 36, to the PSA 38 or to the surface of the step 34 in the land 28.

The geometry of the barrier 32 to acid transfer is dictated by manufacturing tolerances and axial load considerations within the cell stack 10. If the step 34 extends too far below the contact surface 22 of the land region 28, there will be too little pressure within an active area of the cell 11 and this will result in increased cell 11 resistance and reactant cross-over due to inadequate compression of the matrix 16. If the step 34 does not extend far enough below the contact surface 22 of the land region 28 there will be inadequate compression on edge seals (not shown) and reactant leakage will occur. The easiest configuration to manufacture is one where a width of the step 34 is equal to a width of the land region 28. Seal designs where a width of a step is less than that of the land region are acceptable. A depth of the step 34 relative to height of a rib 26A, 26B should be substantially equal to a thickness of the hydrophobic film 36. The depth of the step 34 should be 80 to 120 percent of the thickness of the hydrophobic film 36.

For optimal results, the elastomer bonding 40 must be cured while the hydrophobic film 36 is compressed against the land region 28 to obtain a good acid barrier 32. The fuel cell stack 10 needs to be heated to above 175° C. for an hour to cure the fluoroelastomer bonding 40. This can be done in-situ within the fuel cell stack 10 during the first heat-up cycle of the stack 10. The axial force in the land region 28 of the fuel cell is generally in excess of 345 kPa (50 psi), which is more than adequate to create a good seal. Alternatively, any of the techniques show in DuPont Technical Bulletin H-55005-2 dated December 1996, such as hot bar heat sealing, may be used to create a bond during the manufacturing process and prior to cell assembly.

Figure 4:
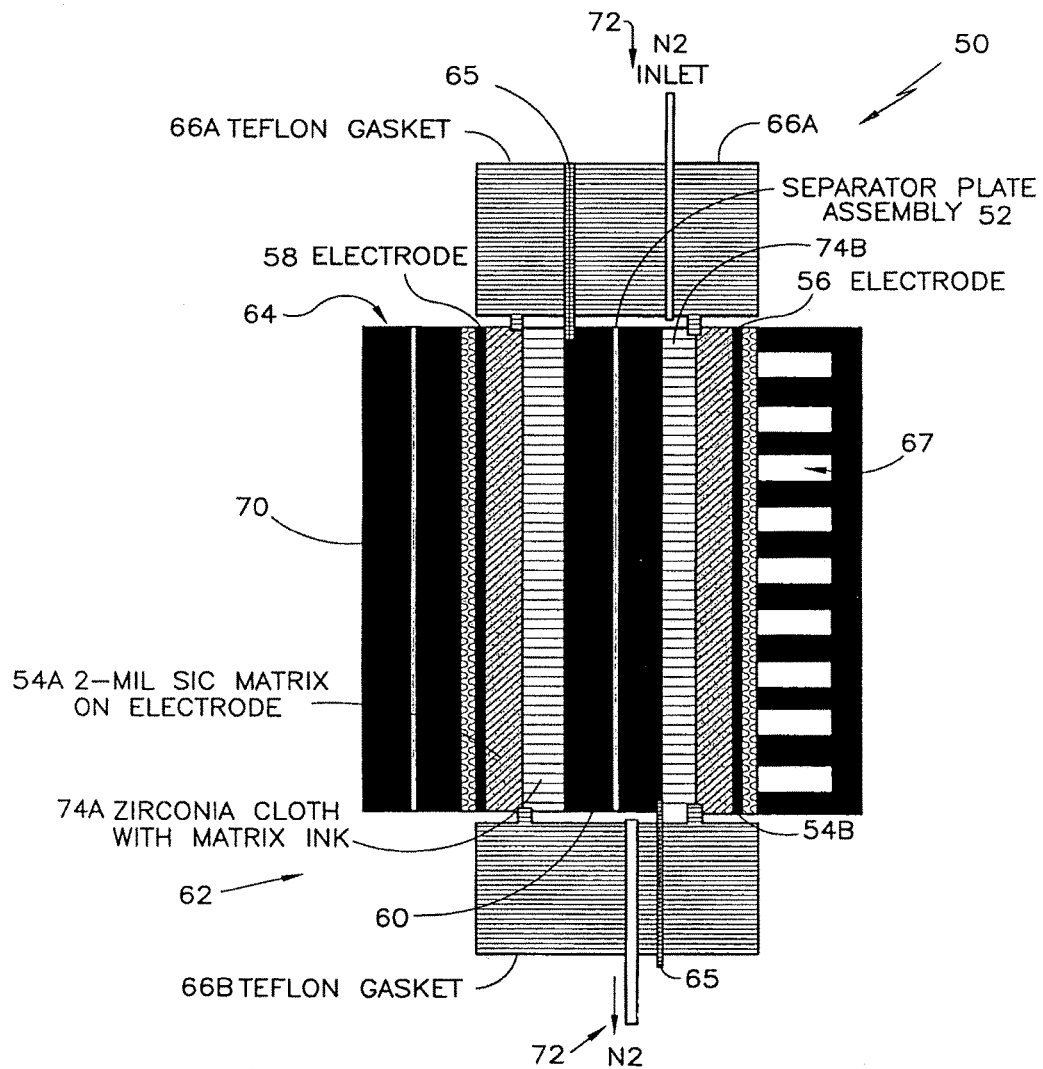
FIG. 4 is a simplified schematic representation of a sub-scale shunt current rig for permitting rapid evaluation of configurations and materials for preventing acid transfer at edges of fuel cell components.

FIG. 4 shows a simplified schematic representation of a sub-scale shunt current rig 50 developed by the inventors herein for permitting relatively rapid evaluation of configurations and materials for preventing acid transfer at edges of fuel cell 11 components. The sub-scale shunt current rig 50 includes a separator plate assembly 52, sandwiched between phosphoric acid filled matrices 54A, 54B. The acid filled matrices 54A, 54B an additional acid filled matrices 74A, 74B prevent electronic shorts and gas cross-over between electrode 56 and electrode 58. The objective of the rig 50 is to measure ionic resistance of any electrolyte path on edges 60 of the separator plate assembly 52. This is done by placing hydrogen gas on both the electrode 56 and the electrode 58 and using a direct current ("DC") power supply to operate the cell 62 including the electrodes 56, 58 and matrices 54A, 54B, 74A, 74B as a hydrogen pump. Current passing through the cell 62 is an ionic shunt current and is measured as a function of a voltage drop across the cell 62. The cell voltage divided by the current is the ionic resistance of the shunt current path. One skilled in the art can convert the ionic resistance to an acid pumping rate for a particular electrolyte, cell design and operating conditions.

The separator plate assembly 52 is aged at an elevated potential and temperature by placing hydrogen on the electrode 58 and nitrogen on the electrode 56 of the separator plate assembly 52. A potentiostat (not shown) is used to set a potential of the separator plate assembly 52 relative to the electrode 58 potential (hydrogen reference electrode). The standard aging condition is 175° C., a water dew point of 54° C. and a potential of 0.875V. This aging condition represents an acceleration factor of about 270× for an air inlet edge (not shown) of a phosphoric acid fuel cell (not shown) that operates at about 0.650 volts at 165° C. Therefore one hour of aging in the sub-scale shunt current rig 50 is equivalent to 270 hours at the air inlet in the cell stack 10 at rated power. This aging condition represents an acceleration factor of about 1140× for an air exit edge (not shown) of the fuel cell that operates at 0.650 volts at 140° C. Therefore one hour of aging in the rig 50 is equivalent to 1140 hours at the air exit in the cell stack 10 at rated power. The sub-scale shunt current rig 50 includes other components including: a first reactant flow field 64 and a second reactant flow field 67 with inlet and exit passages (not shown) for directing flow of the hydrogen, nitrogen and air through the cell 62; gold wire 65 connected to the separator plate assembly 52; TEFLON® gaskets 66A, 66B for sealing the cell 62; passageways 72 for directing flow of nitrogen around edges of the separator plate assembly 52; a laminated electrolyte reservoir plate ("LERP") reactant flow field 70 with inlet and exit passages (not shown) secured adjacent the electrode 58; and, zirconia cloth layers 74A, 74B with a matrix ink secured adjacent opposed surfaces of the separator plate assembly 52.

Figure 5:
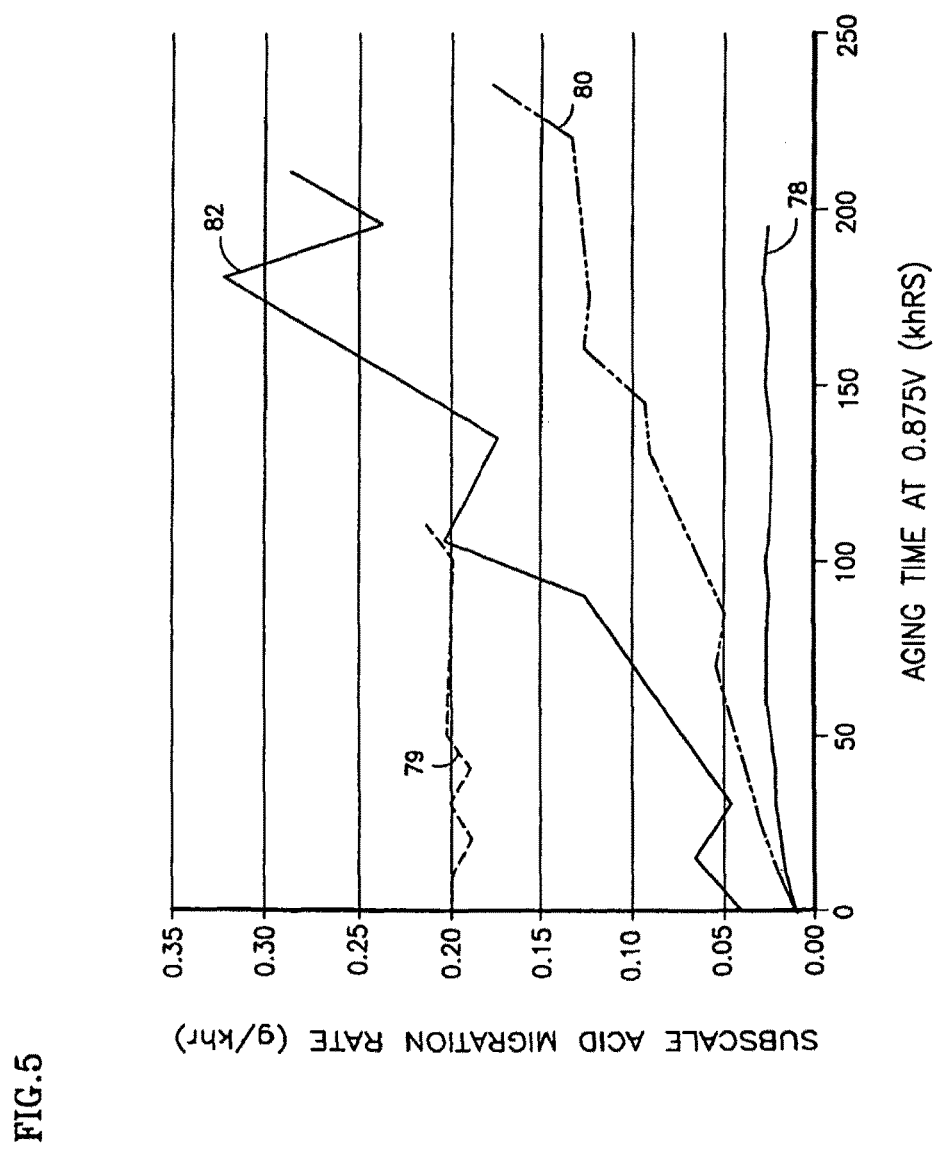
FIG. 5 is a graph showing "acid migration rate . . . " as a function of "aging time" for a separator plate assembly within the FIG. 4 sub-scale shunt current rig.

FIG. 5 shows an acid pumping or "subscale acid migration rate . . . " as a function of aging time for a separator plate assembly 52 with bare edges 60. The untreated edges 60 start out with a high acid transfer rate that stays high with increasing time as shown at reference numeral 79 in FIG. 5. Tests were also run to establish if curing the bonding agent elastomer 40 prior to assembly of the cell 62 was detrimental. Two exemplary separator plate assemblies were made with 0.127 mm (5 mil) thick PTFE film, that extended approximately 0.762 mm (30 mils) beyond the edge 60, with the PTFE film containing an acrylic PSA, and with about 0.019 mm (0.75 mils) of FLUOROLAST® painted on the land region of the separator plate assembly. The FLUOROLAST® in one assembly was cured at 190° C. for two hours without any compression. The other assembly was cured within the shunt current rig at 190° C. for two hours under a compressive load of about 100 psi. Sub-scale shunt current testing was done with both assemblies and is also shown in FIG. 5. The assembly that was cured under pressure has a low acid transfer rate as shown at reference numeral 78 in FIG. 5. The assembly that was cured without any compression has a higher transfer rate as shown by reference numeral 82.

Another separator plate assembly was made with 0.127 mm (5 mil) thick PTFE film, that extended approximately 0.127 mm (5 mils) beyond the edge, that contained an acrylic PSA, with about 0.019 mm (0.75 mils) of FLUOROLAST® painted on the seal region. This assembly was cured within the shunt current rig at 190° C. for two hours under a compressive load of about 100 psi. Sub-scale shunt current testing was done. The assembly where the PTFE film extended 0.127 mm (5 mils) beyond the edge, as represented by reference numeral 80 in FIG. 5, had a significantly higher acid transfer rate than the assembly where the PTFE extended 0.75 mm (30 mils) 78 as shown in FIG. 5.

In alternative embodiments, the barrier 32 may simply protrude beyond the edge 30 of the separator plate assembly, or it may be a formed portion of the separator plate assembly. Care should be taken so that barriers do not interfere with reactant manifold seals (not shown). For purposes herein, the word "about" is to mean plus or minus ten percent.

What is claimed is:

1. A method of manufacturing a stack of liquid electrolyte fuel cells having a barrier configured to prevent migration of the liquid electrolyte between the fuel cells, the method comprising:

securing the barrier configured to prevent migration of the liquid electrolyte between the fuel cells to a land region of a separator plate assembly of at least one of the fuel cells, wherein the land region extends from an edge of the separator plate assembly toward an adjacent flow channel defined within the separator plate assembly;

securing the barrier adjacent the land region so that a first portion of the barrier extends across at least a portion of the land region and a second portion of the barrier extends outwardly and away from the edge of the separator plate assembly, wherein the first portion of the barrier directly contacts the electrode; and securing the separator plate assembly adjacent an electrode of the at least one of the fuel cells so that the flow channel is adjacent the electrode and the second portion of the barrier extends outwardly and beyond an edge of the electrode that is aligned with the edge of the separator plate assembly.

2. A method according to claim 1, wherein the barrier comprises a hydrophobic film which extends away from the edge of the separator plate assembly between about 0.051 and about 2.0 millimeters (about 2 and about 80 mils).

3. A method according to claim 1, wherein the barrier comprises a hydrophobic film which is between about 0.05 mm and 0.127 mm (about 2 mils and about 5 mils) thick.

4. A method according to claim 1, wherein the barrier comprises a hydrophobic polymer film that is distinct from the material of the separator plate assembly.

5. A method according to claim 4, wherein said hydrophobic polymer film is selected from polytetrafluroethylene, fluorinated ethylene propylene and polyfluoroaloxy copolymer resin.

6. A method according to claim 1, comprising
defining a step within the land region of the separator plate assembly; and
securing the first portion of the barrier within the step and wherein the step and the first portion of the barrier extend all of a distance between the edge of the separator plate assembly and the flow channel.

7. A method according to claim 1, comprising
defining a step within the land region of the separator plate assembly; and
securing the first portion of the barrier within the step and wherein the step and the first portion of the barrier extend only a portion of a distance between the edge of the separator plate assembly and the flow channel.

8. A method according to claim 1, comprising bonding the barrier to a step formed in the land region.

9. A method according to claim 8, comprising bonding the barrier to the step with a fluoroelastomer.

10. A method according to claim 9, wherein the fluoroelastomer has a fluorine content greater than about 68% by weight.

11. A method according to claim 8, comprising bonding the barrier to the step during the manufacturing process, prior to assembly of fuel cells into the stack.

12. A method according to claim 1, comprising bonding the first portion of the barrier to a section of the land region in situ within the stack during initial heating up of the stack.

13. A method according to claim 1, wherein the barrier comprises a hydrophobic polymer film coated with pressure sensitive adhesive on a surface of the polymer film.

14. A method according to claim 13, wherein the pressure sensitive adhesive is selected from an acrylic adhesive and a silicone adhesive.

15. A method according to claim 1, comprising securing a second barrier to a second land region of the separator plate assembly, the second barrier extending from a second edge of the assembly all or a portion of a distance between the second edge and a second flow channel, said second barrier configured to extend away from the second edge of the separator plate assembly in a direction away from the second flow channel.

16. A method according to claim 1, comprising securing a barrier of hydrophobic polymer film to the land region while compressing the hydrophobic polymer film toward the adjacent land region.

17. A method according to claim 16, comprising compressing the hydrophobic polymer film toward the adjacent land region by an axial force of at least 345 kPa (50 psi).

18. A method according to claim 1, wherein the land region includes a step having a depth that is about equal to a thickness of the barrier.

19. A method according to claim 18, wherein the depth is between about 80% and about 120% of the thickness of the barrier.

20. A method according to claim 1, comprising aligning the edge of the electrode and the edge of the separator plate assembly to be coplanar.

21. A method of making a stack of liquid electrolyte fuel cells having a barrier configured to prevent migration of the liquid electrolyte between the fuel cells, the method comprising:
situating a plurality of fuel cells adjacent each other, the fuel cells respectively having electrodes;
situating a separator plate between one of the electrodes of one of the fuel cells and an adjacent one of the electrodes of an adjacent one of the fuel cells, the separator plate having outside edges aligned with outside edges of the electrodes; and
securing the barrier configured to prevent migration of the liquid electrolyte between the fuel cells to a land region of the separator plate, the barrier comprising at least one piece of material that is distinct from the material of the separator plate assembly, the barrier having a first portion that extends across at least a portion of the land region and a second portion that extends outwardly beyond and away from the edge of the separator plate, wherein the first portion of the barrier directly contacts at least the portion of the land region and the one of the electrodes of the one of the fuel cells.

22. The method of claim 21, wherein the first portion of the barrier is received against at least the portion of the land region and the one of the electrodes of the one of the fuel cells.

23. The method of claim 1, wherein the first portion of the barrier is received against the electrode.

\* \* \* \* \*